J. W. McNEAL.
CHECK ROW CORN PLANTER.
APPLICATION FILED APR. 20, 1918.
1,286,044.
Patented Nov. 26, 1918.
2 SHEETS—SHEET 2.
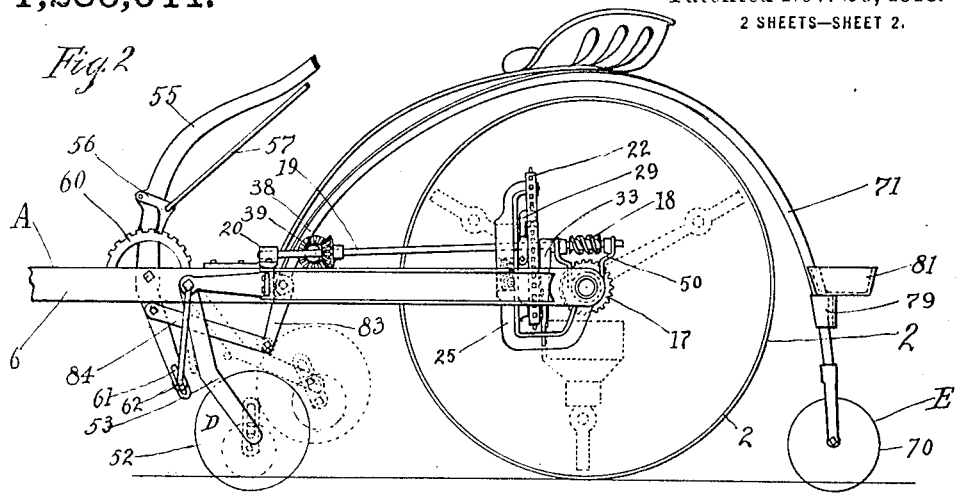
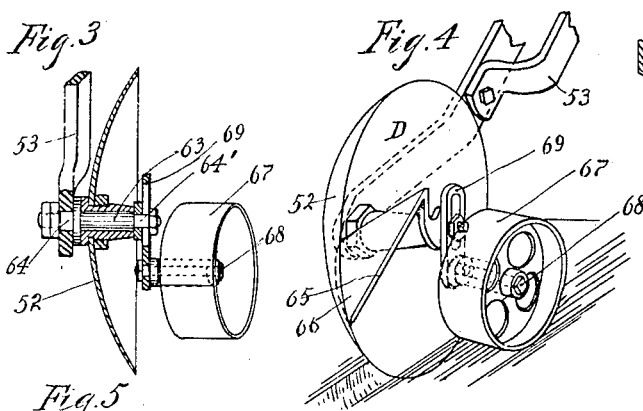
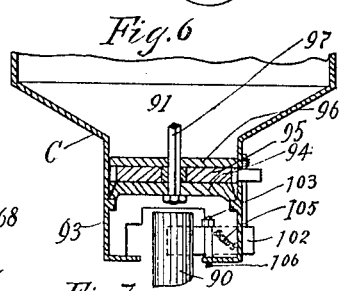
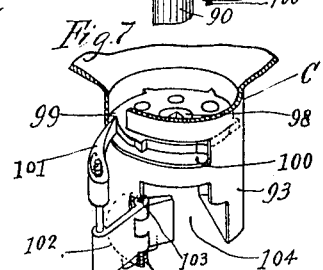
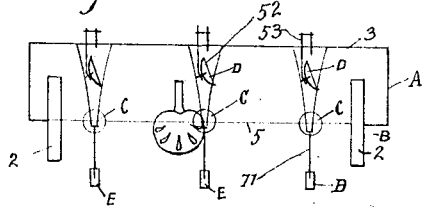
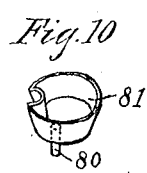
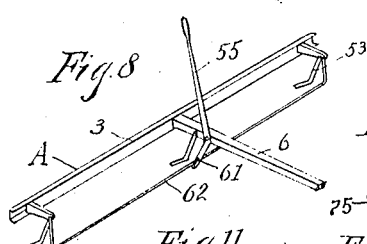
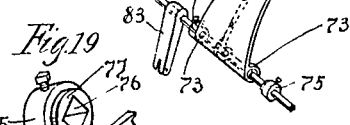
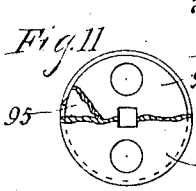
Inventor,
Joseph W. McNeal
his Attorney.

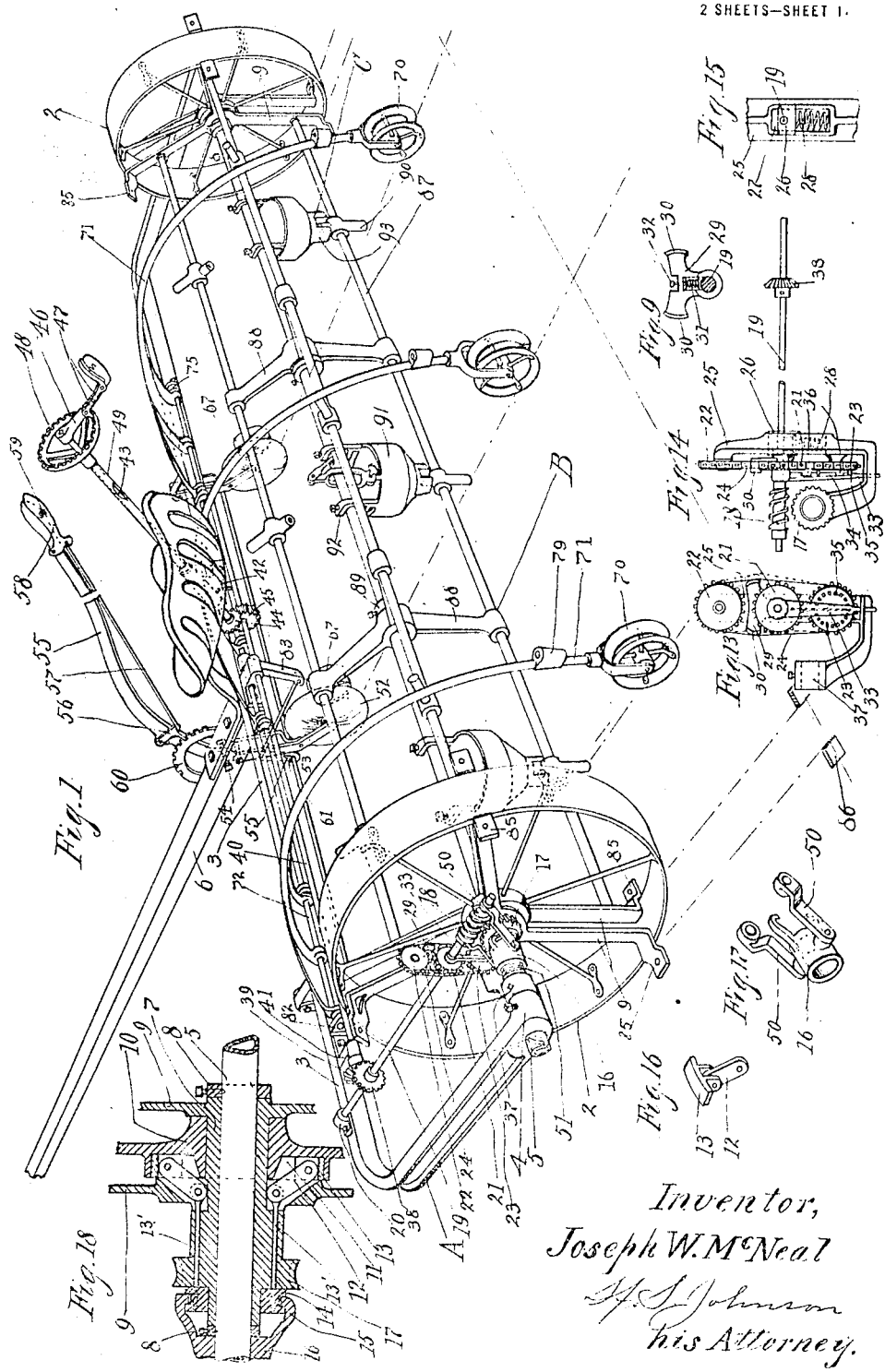

UNITED STATES PATENT OFFICE.

JOSEPH W. McNEAL, OF ST. PAUL, MINNESOTA.

CHECK-ROW CORN-PLANTER.

1,286,044.

Specification of Letters Patent.

Patented Nov. 26, 1918.

Application filed April 20, 1918. Serial No. 229,844.

*To all whom it may concern:*

Be it known that I, JOSEPH W. MCNEAL, a citizen of the United States, residing at St. Paul, in the county of Ramsey and State of Minnesota, 1823 Laurel avenue, have invented certain new and useful Improvements in Check-Row Corn-Planters, of which the following is a specification.

This invention relates to check row planters and particularly to the type designed to plant the seed in continuous transverse rows without the use of the usual wire which, customarily, is stretched across the field and staked into position.

The object of the invention is to provide improved means for planting corn in even checks on rough as well as on smooth ground, said means including conveniently resettable devices, whereby the parts may so quickly be set into proper check at any time from the seat occupied by the operator as to eliminate the necessity of stopping or even slowing up the progress of the machine.

A further object is to provide a machine wherewith more than two rows of corn may be planted at the same time, regardless of excessively uneven or rolling land.

Another object of the invention is to provide a machine of this class embodying certain novel features of construction, rendering practical a structure of sufficient width to plant three or more rows at a time.

The invention consists in the combination and arrangement of parts, shown in the drawings and described in the specification of which the drawings form a part.

Figure 1 is a perspective view of a corn planter embodying my invention,

Fig. 2 is a semi-diagrammatic side view of Fig. 1,

Fig. 3 is a sectional elevation of the disk opener,

Fig. 4 is a perspective view of the same showing the disk scraper,

Fig. 5 is a diagrammatic plan view of the machine showing the alinement of some of the main elements, Fig. 6 is a fragmentary sectional view of the corn dropping devices, Fig. 7 is a perspective view of the same, Fig. 8 is a perspective diagrammatic outline of some of the disk opener controlling mechanism, Fig. 9 is a front view of a detail, Fig. 10 is a perspective view of the ballast box, Fig. 11 is a plan view of a detail, Fig. 12 is a perspective view of a detail of the covering device, Fig. 13 is a front elevation of a part of the marker controlling mechanism, Fig. 14 is a side view of the same, Fig. 15 is a fragmentary front view of a detail, Figs. 16 and 17 are perspective views of details, Fig. 18 is a fragmentary sectional view of the clutch mechanism, Fig. 19 is a perspective view of a collar for the covering mechanism, and Fig. 20 is a side view of a detail.

Referring to the drawings (Fig 1) the invention comprises a rigid element or frame A supported on wheels 2, a rotary element B including a reel and the wheels 2, the reel being attachable to one of the wheels to move therewith and seed corn dispensing devies C supported in the frame A, and within the reel.

The invention further comprises furrow cutting mechanism D and furrow closing devices E, all movably hung in the frame A. The frame A comprises a bail composed of a front bar 3 and a pair of side bars terminating in a hub 4 wherein is rigidly held by means of set screws the hollow shaft 5. The frame further comprises a draft bar 6 projecting forwardly from the bar 3 to which it is rigidly secured.

Rotatably mounted on the shaft 5 is a sleeve 7 held in position thereon by collars 8. Journaled on the sleeve 7 between the marker frames 9, which are integral with the sleeve, is the hub 10 of wheels 2. Recessed in the outer face of the hub 10 is a clutch chamber 11 wherein work the clutch levers 12 having friction shoes 13 engaging the cylindrical wall of the chamber 11 whereby when the levers 12 are caused to be moved inwardly at their inner ends toward the hub 10, the shoes will clutch the cylindrical surface and cause the hub 7 to rotate therewith.

Pivotally connected with the inner ends of the levers 12 and arranged parallel with the long axis of the shaft 5 are shift rods 13' secured in a grooved shift collar 14 rotatably fitted on the outer end of the sleeve 7. Slidably mounted on the shaft 5 and having a pair of inwardly projecting arms 15 is the sleeve 16.

The arms 15 at their inner ends are formed with a downturned portion fitted in the groove of said shift ring so that when said sleeve 16 is slid along the shaft 5, the shift ring through the medium of the rods 13 will actuate the levers 12, thereby breaking the frictional connection between the shoes 13 and the cylindrical wall in the clutch chamber.

Adjacent to the shift ring 14 and integral with the hub 7 is the worm wheel 17 wherein works the worm 18, which is rigidly mounted on a shaft 19 disposed transversely to the shaft 5 and projecting forwardly and pivotally journaled on the bar 3, the under surface of journal box 20 presenting a rounded rolling surface so as to permit the shaft 19 to be raised or lowered at its inner end.

Rigidly mounted on the shaft 19 near the shaft 5 is a sprocket wheel 21 which is in alinement with an upper sprocket wheel 22 and a lower sprocket wheel 23, an endless sprocket chain 24 engaging all of said sprocket wheels. The wheels 22 and 23 are journaled in the housing 25, the shaft 19 being journaled in a journal block 26 which latter is slidably mounted in an opening 27 in the housing.

A spiral spring 28 tends constantly to resist the downward movement of the journal block 26. Frictionally mounted on the shaft 19 between the sprocket wheel 21 and the housing is the shifting cam 29 having a pair of pallets 30 adapted to engage the endless chain 24 on either side of the shaft 19 so that when the shaft 19 is actuated in either direction, the pallets may press the chain outwardly away from the teeth of the sprocket wheel 21 and thereby disengage the latter from the chain on either side as indicated in Fig. 13.

However if the shift cam is moved as indicated by dotted lines in Fig. 13, the slack on one side of the wheels in the chain 24 will be taken up and cause the chain to engage the teeth of the sprocket 21 on that side.

Thus in the ordinary operation of the machine when the shaft 19 is turned in either direction continuously, the shifting cam will lean against the chain and hold it pressed outwardly while the shaft will rotate against the friction in the journal of the cam.

A spring 31 in the shifting cam is arranged to exert pressure on shaft 19 and has screw adjustment 32 whereby the force in the spring may be changed as desired.

Between the worm 18 and the sprocket 21 and loosely mounted on the shaft 19 is a locking arm 33 projecting downwardly and passing slidingly through the housing 25 at its lower end. On its face opposite the sprockets the arm is provided with a longitudinal rib 34, which is adapted to engage a circular row of teeth 35 for the purpose of locking the sprocket against movement.

Thus the rib 34 may slide vertically in the space between the teeth 35 so that when the worm 18 is moved downwardly to engage the worm wheel 17, the rib will slide between the teeth in a downwardly direction. When however the worm has fully engaged the worm wheel, notches 36 in the rib 34 will permit the teeth to pass through it and thus render the sprocket 23 free to be moved.

The housing 25 has a rearwardly and upwardly projecting arm terminating in a hub 37 which surrounds the shaft 5 and is rigidly secured thereto. On the forward end of the shaft 19 is a beveled gear 38 meshing with a beveled gear 39 at right angles thereto, which in turn is rigidly mounted on a cross shaft 40 which is journaled on brackets 41 on the bar 3.

Journaled in a bracket 42 and extending in an upwardly and rearwardly direction is an operating post 43 having at its lower end a beveled gear 44 which meshes with a beveled gear 45 on the shaft 40.

At the top of the operating post 43 is a crank 46 whereby the post may be turned by hand in either direction, the handle being provided with a pair of spring controlled connected bell cranks 47, the downwardly projecting leg of one of said cranks being adapted to enter the notches in the circular rack 48 mounted at the top of the inclosing tube 49 surrounding the post.

Thus as the handle is grasped and the bell cranks thereby operated, the crank will be freed from the rack 48 so that it may be freely moved in either direction.

Pivotally connected with the sleeve 16 at one end and journaled on the shaft 19 at the other end are a pair of connecting links 50. When the crank 46 is actuated the sprocket gear 21 will be caused to rotate the shift cam 29 having been previously caused to engage the chain 24. The gear will travel downwardly on the taut side of the chain, thereby moving the shaft 19 and through the medium of the links 50 causing the sleeve 16 to slide outwardly on the shaft 5 and against the tension of a spring 51 encircling the shaft 5 and abutting against the hub 37 of the housing 25.

The movement of the sleeve 16 will in turn actuate the ring 14 and therethrough actuate the clutch to disconnect the marker frames 9 from the wheel 2.

The furrow cutting mechanism D comprises a plurality of bowled cutting disks 52 rotatably mounted at the outer end of swinging arm 53, said arm being pivotally hung in the frame A at a point forward of the wheels 2.

Having fulcrum 54 in the frame is a hand lever 55 having pivotally hung in its shank a dog 56, which has rod connection 57 with a spring pressed sub-lever 58, the spring 59 tending constantly to keep the dog 56 in engagement with the teeth of a segment 60 secured in the frame, whereby the lever 55 may be held locked in any chosen position.

Working in a slot 61 at the lower end of the lever 55 and extending width-wise across the front of the machine and pivoted with the arms 53 in the frame, is a bail 62 (Fig. 8) bent upwardly at its outer ends where it is pivotally hung in the pivot of the arms 53.

Thus when the lever 55 is actuated in a forward direction, the bail will be moved rearwardly and engage the arms 53, thereby moving them around their pivots and lifting them rearwardly as shown in dotted lines (Fig. 2).

The rotatable mounting of the disk 52 comprises a journal bolt 63 having the squared portions 64 and 64', whereby the bolt will be held against turning in the arm 53.

Fitted over the squared portion 64' at the outer end of the bolt is a scraper 65 having a downturned blade 66, its lower inner edge conforming to the concavity of the disk 52, whereby the disk is freed from adhering soil.

Further mounted on said square portion 64' is a colter wheel 67 which is rotatably hung on a journal bolt 68 secured at the lower end of a slotted link 69, the slot whereof fits slidably over the square portion 64' at the outer end of the bolt 63, said slot providing vertical adjustment for the colter wheel which may be firmly held by means of a nut as shown. Thus when the arm 53 is moved bodily together with the disk 52 and the colter wheel 67, the relationship between the parts is maintained.

The furrow closing devices E comprise a plurality of covering wheels 70 journaled in the outer ends of the curved arms 71, said arms being pivotally hung on a square bar 72 journaled on the bar 3 by means of brackets 82. The pivot ends of the arm 71 are formed with comparatively widely separated lugs 73 pierced by square openings 74 wherein the square bar 72 loosely operates, so as to permit in the arm 71 a certain restricted rotary movement.

Referring to Fig. 20, it will be noted that the bar 72 working in the opening 74 in the lugs 73 work sufficiently loose therein to permit the arms 71 to be raised and lowered at its outer end. However, the looseness of the bar 71 in the opening 74 would permit the arms 71 to wabble transversely, which obviously would interfere with proper covering of the seed.

To overcome this, collars 75 are provided, having openings 76 wherein the bar 72 closely fits, the collars being formed with a boss 77 which fits rotatably in the recess 78 in the outer faces of the lugs 73. Thus the arm 71 is held axially central and rotatably on the bar 72.

A socket 79 located just above the covering wheel and secured on the arm 71 is adapted to receive the downwardly projecting pin 80 of a ballast box 81, wherein may be placed suitable ballast to secure adequate pressure on the soil in the covering of the seed.

Rigidly secured on the bar 72 and in alinement with the hand lever 55 and projecting downwardly is an arm 83, the lower end of which is pivotally connected with a connecting bar 84 which is pivotally connected with the lever 55 at a point below the fulcrum 54. Thus when the lever 55 is thrust forwardly the rod 72 through the medium of the arm 83 and the connecting bar 84 will be caused to turn in its bearings in the brackets 82 and thereby lift the covering wheels from the ground.

Owing to the looseness of the bar 72 in the opening 74 of the lugs 73, the lever 55 necessarily must move initially a short distance before it becomes effective to raise the arms 71. This is likewise the case with respect to the bail 62 which (as will be noted in Fig. 2) requires a certain preliminary free movement before the bail can engage the arms 53. Thus when the lever 55 has passed through its initial ineffective stroke it will begin to lift the covering wheels and the cutting disks simultaneously.

Referring to the marker mechanism the arms 9 are provided at their outer ends projecting at right angles therefrom with marker plates 85, having bolt holes whereby when it is desired to make deeper impressions, pallets of various forms may be bolted thereto. These plates may be arranged with respect to the peripheral faces of the wheels 2 to either be flush or project beyond said faces. The plates project from the inner and outer edges of the wheel rim and are directly opposite each other.

Thus when the marker plates are rotated with the wheels 2, the plates 85 leave successive impressions 86 in the soil, the spaces between the impressions being the usual distance between the rows. The wheels 2 roll midway between the longitudinal rows so that when the machine after arriving at the end of a row is turned to the right on its return trip, the right hand wheel on its return trip will retrace its path which it had previously marked, the inner marker plates now being caused to register with the marks left by the outer marker plates on the initial trip.

Obviously if there were marker plates on the inside of the wheels only, the operator would be obliged from his position on the machine on his return trip to look through the wheel between the spokes in his endeavor to judge the alinement of the inner plates with the mark left on the previous trip at the outside of the wheel. This is impractical because of the interruptions of the view by the spokes and the marker frame.

I therefore provide marker plates on both edges of the rim of the wheel to obviate this disadvantage.

In my co-pending application filed Feb. 12, 1918, Serial No. 216,786, I have shown a reel and marker mechanism somewhat similar to that shown in my present invention but the reel was attachable to both wheels.

In my present invention, I have shown the reel rigidly connected with the inner marker frames 9. The reel comprises a plurality of laterally disposed rods 87 parallel with the shaft 5 and rigidly mounted equidistant therefrom and rotatable thereon in a plurality of spiders 88 held in position by collars 89. The rods 87 when actuated describe a circular path through which they carry a plurality of seed guide tubes 90 which coöperate with said dispensing devices C hung in the frame A.

The said dispensing devices are similar to those shown in my co-pending application hereinbefore mentioned and comprise a plurality of seed boxes 91 removably suspended from the shaft 5 by means of a pair of screw-fastened hangers 92. The lower portion of the seed box is reduced in size and forms a cylindrical neck 93 movably supporting three inner coöperating disks 94, 95 and 96, each having a central square opening through which passes slidingly the rod 97 on which the disks may be strung and retained by a nut on the lower end of the rod. The disk 95 has a central section 98 about which it rotates, the disk being provided with interspaced teeth 99 on its periphery.

Engaging said teeth through the slot 100 in the neck 93 is a spring pressed pawl 101 pivotally mounted on a dog or lever 102 which rotates about the pin 103 mounted in the bottom of the neck and projecting into the passage 104 to obstruct the latter.

A spring 105 tends constantly to keep the dog in position shown in Fig. 7. The three disks 94, 95 and 96 are superimposed one upon another (Fig. 6). The disks are strung on the rod 97 in a manner to bring the openings in disk 94 opposite the opening in disk 96, the openings in both being adapted to register with those in disk 95. Thus the kernels will first enter the opening in the disk 96 and then pass through the opening in the disks 95 and 94 and in turn into the seed guide tubes 90.

That portion of the dog 102 projecting into the path 104 has yieldable connection with the main body of the dog as by a hinge as shown in Fig. 7, so that when the guide tubes pass through the opening 104 when the reel is actuated, it may be free to pass through it in either direction, the projecting portion of the dog yielding in one direction by being returned to its normal position by a spring 106.

Thus as the reel is turned and the seed guides successively enter the opening 104, the pawl 101 is caused to intermittently turn the disk 95 through the spring 105. But if the reel should be reversed in its movement the projecting portion of the dog would yield and permit it to pass.

In operation the lever 55 is moved from a forward position to the position shown in Fig. 1 whereby the furrow cutting and covering mechanism is actuated to contact with the ground.

The crank 46 is now released from the rack 48 and as previously described turned to the right or left, thereby actuating the marker frames for the purpose of bringing a pair of the plates thereof in contact with the ground at the starting point selected.

After the marking plates are suitably positioned, the crank 46 is caused to slightly retrace its movement until the cam 29 stands in a vertical position as shown in Fig. 13, when the chain 24 will have been disengaged from the sprocket 21 thereby subjecting the shaft 19 and the parts supported thereon to the influence of the spring 28 which will move the parts in an upwardly direction, thereby disengaging the worm wheel 19.

This upward movement of the shaft 19 carries with it the locking arm 33 which through the rib 54 locks the sprocket 23 against further movement. The machine is now ready to advance.

As the machine progresses the covering wheels 70 and the furrow cutting disks 52 will conform by gravity to the surface of the ground, the cutting disks 52 being controlled in depth by the colters 67.

If during the progress of the machine the operator notes that the marker plates 85 are not registering with the impressions (previously made on the up trip) in the ground, he instantly moves the crank 46 in the desired direction to correct the difference without stopping the progress of the machine, because the moving of the marker frames is effected by a movement of the crank 46 in one continuous direction, necessitating no reversal of movement.

Thus a correction of any inaccuracy between marking mechanism and the impression previously made in the ground may be readily corrected within the space between two rows, which obviates the necessity of stopping and backing up the machine to avoid the loss of a row of corn.

As shown in the drawing, the reel which carries the four marker frames 9 is driven when in action by one of the wheels 2 which leaves the other wheel free so that the machine may be readily turned around.

I claim:

1. In a corn planter of the class described, the combination with a frame, supporting wheels therefor, and seed dispensing devices, of a reel between said wheels and rotatable on said frame and engaging said seed dispensing devices, said reel having marker devices on each of its ends, and hand operable means for operatively connecting the reel with one of said wheels.

2. In a corn planter of the class described, in combination with a frame; of a rotary element part of which supports the frame, seed dispensing devices engaging said rotary element to be actuated thereby when said frame supporting part is actuated, and means between the frame and said rotary element and including a lever, whereby by the sole movement of said lever in one direction said frame supporting part may be first disconnected from said rotary element and the latter then actuated for the purpose set forth.

3. In a corn planter of the class described, in combination with a frame and rotatable supporting means therefor, of seed dispensing devices on the frame, including a hinged operating lever for actuating them, and lever actuated rotatable marker devices independently rotatable in either direction on the frame and connectible with said rotatable supporting means to simultaneously actuate when connected and moved in one direction, said marker devices and said operating lever but adapted to actuate the hinged portion of said operating lever to render the dispensing devices ineffective when it is moving in reversed direction.

4. In a corn planter of the class described, the combination with a frame, of a rotary element having a plurality of marker devices, rotatable frame supporting means, rotatably supported on said rotary element and a lever actuated connecting mechanism on the frame for connecting said rotary element with said rotatable frame supporting means, said connecting mechanism comprising a gear train for differentiating the speed of rotation at the terminals of said connecting mechanism.

5. In a corn planter of the class described, the combination with the frame and supporting wheels therefor, of rotatable marker devices adjacent the inner and outer sides of said wheels and detachably connected thereto, a lever, and means between said lever and said wheels whereby by a single bodily movement of said lever said marker devices are first detached from said wheels and then rotated.

6. In a corn planter of the class described, in combination with a frame, supporting wheels therefor and seed dispensing devices on said frame, of marker devices on each side of the frame, connected to each other and independently rotatable on said frame between said wheels and connectible with one of the latter to rotate therewith when the machine is moved, lever actuated means for connecting said connected marker devices to one of the wheels, and means on the connection connecting said marker devices to actuate said seed dispensing devices when the machine is moved.

7. In a corn planter of the class described, the combination with a frame, supporting wheels therefor, a rotary element including a plurality of marker devices connectible to said wheels, and lever actuated connecting mechanism on the frame for connecting said marker devices to said wheels comprising a gear train for differentiating the rate of rotation at the terminals of said connecting mechanism.

8. In a corn planter of the class described, the combination with a frame, supporting wheels therefor, and marker devices independently rotatable on the frame and connectible with the wheels to rotate therewith to leave imprints in the soil when the wheels are rotated; of lever actuated mechanism for independently rotating said marker devices to change their position relative to the wheels, comprising rotatable shafting mounted on the frame and operatively connected with said lever, whereby said shafting may be rotated in either direction, separable marker engaging means normally separated between said shafting and marker devices to engage the latter to rotate them, and means on the frame and operatively connected with said shafting to control said engaging means to engage said marker devices when the shafting is rotated in either direction.

In testimony whereof I affix my signature in presence of two witnesses.

JOSEPH W. McNEAL.

Witnesses:
GEORGE VOELKER,
F. WINKLER.